United States Patent [19]

Bailey

[11] 4,014,394
[45] Mar. 29, 1977

[54] RESTORING LOST CIRCULATION
[75] Inventor: Daniel F. Bailey, Midland, Tex.
[73] Assignee: Phillips Petroleum Company, Bartlesville, Okla.
[22] Filed: May 19, 1975
[21] Appl. No.: 579,120
[52] U.S. Cl. .............................. 175/72; 252/8.5 LC
[51] Int. Cl.$^2$ .................. C09K 7/02; E21B 33/138
[58] Field of Search ........ 252/8.5 LC, 8.5 A, 8.5 B; 175/72

[56] References Cited
UNITED STATES PATENTS

| 1,867,063 | 7/1932 | Dawe | 252/309 X |
|---|---|---|---|
| 1,943,584 | 1/1934 | Cross | 252/8.5 |
| 3,185,642 | 5/1965 | Sawyer et al. | 252/8.5 |

OTHER PUBLICATIONS

Rogers, Composition and Properties of Oil Well Drilling Fluids, Gulf Pub. Co., Third Edition, 1963, pp. 658–662.

Primary Examiner—Herbert B. Guynn

[57] ABSTRACT

A magnesium oxide-bentonite slurry having a controlled gelation time and capable of gelling to a firm set gel is used to restore lost circulation during well drilling operations.

9 Claims, No Drawings

RESTORING LOST CIRCULATION

This invention relates to restoring lost circulation.

In the drilling of a well with well drilling tools a drilling fluid is circulated into and out of the well bore as a necessary step in the operation. The drilling fluid serves to cool and lubricate the bit, to carry cuttings to the surface, to support at least part of the weight of the drill pipe and drill bit, to provide a hydrostatic pressure head for prevention of caving of the walls of the well bore, to deposit on the surface of the well bore a filter cake which acts as a thin, semi-impervious layer to prevent undue passage therethrough of fluids, and to perform other functions as are well known in the drilling art.

When drilling through porous or fractured formations of other formations having a relatively high porosity or permeability to the drilling fluid it sometimes occurs that the drilling fluid is lost to the formation and a condition referred to as lost circulation obtains wherein the drilling fluid passes into the formation at such a rate that circulation is greatly reduced or even terminated. In such case the drilling of the well must be stopped and the condition corrected before drilling can be continued again. If the condition of lost circulation cannot be corrected, it is then necessary to abandon the well.

Various methods and means in the past have been employed to restore circulation of the drilling fluid when a lost circulation condition has occurred and such methods usually entail the addition to the drilling mud of fibrous materials to form a mat upon which a mud sheath can be deposited. Almost all known fibrous materials have been used in drilling fluid compositions to seal the thief formation in attempts to restore circulation of the drilling fluid when a lost circulation condition has been encountered.

The present invention provides a method of combating lost circulation. Broadly speaking, the invention comprises introducing into a zone of lost circulation, e.g., a thief formation, an aqueous slurry comprising bentonite and a magnesium oxide gelling agent.

Thus, according to the invention there is provided a method for decreasing the permeability of a zone of lost circulation located in a formation penetrated by a well bore, which method comprises introducing into said well and into said zone an aqueous slurry comprising bentonite suspended in sufficient water to render said slurry pumpable and sufficient magnesium oxide to cause gelation of said slurry to a set gel after placement thereof in said zone.

Any suitable grade of bentonite can be used in the practice of the invention. However, the more pure grades are preferred. Wyoming bentonite is a preferred bentonite because of uniformity in properties and uniformity of results consequently obtained when using same. The most preferred bentonites are those meeting the specifications set forth in Section 3 of API Spec 13A, Sixth Edition, January 1974. The bentonite slurries can be prehydrated (aged) or freshly prepared slurries.

The quantity of bentonite used in the practice of the invention will vary with the purity and/or grade of the bentonite, and the salinity of the water used in preparing the aqueous slurries. Thus, the invention should not be limited to any specific concentrations of bentonite in said aqueous slurries. In all instances the bentonite will be suspended in sufficient water to render the slurry pumpable, initially. Generally speaking, and as a guide to those skilled in the art, the amount of bentonite used will be in the range of from 15 to 40, preferably 20 to 35, more preferably 25 to 30 pounds per barrel of slurry (ppb).

As indicated above, the salinity of the water used has an effect on the quantity of bentonite used in the slurries which are used in the practice of the invention. It is well known that salts such as sodium chloride decrease the swelling (yield) of bentonite. Therefore, it is definitely preferred that the water used in the practice of the invention be fresh water.

Any suitable grade of magnesium oxide can be used in the practice of the invention. The commercially available grades of magnesium oxide are usually quite satisfactory. If desirable for economic reasons, burned dolomite or calcined magnesite can be used. The dolomite or magnesite should be burned at a temperature that will cause decomposition of the magnesium carbonate to magnesium oxide, but which will not effect any significant decomposition of the calcium carbonate to calcium oxide. Usually, temperatures in the order of 250° to about 900° C. will be satisfactory.

The invention should not be limited to any specific concentrations of magnesium oxide in the aqueous slurries used in the practice of the invention. In all instances the amount used will be an amount sufficient to cause gelation of the MgO-bentonite slurry after said slurry has been placed in the zone of lost circulation, e.g., a thief formation. Thus, the amount of magnesium oxide used will be an amount sufficient to provide a gelation time which is long enough to permit pumping said slurry into the well and place same in the loss zone before the slurry gels to a set gel. Generally speaking, the amount used will be the smallest amount which is sufficient to accomplish this placement of said slurry. Thus, the amount of magnesium oxide used will depend to a large extent upon the depth of the loss zone in the well. As a guide to those skilled in the art, the amount of magnesium oxide used will usually be in the range of from 0.15 to 1.5 pounds per barrel of slurry. In many instances an amount within the range of from 0.2 to 1.2 ppb will be sufficient.

The magnesium oxide-bentonite slurries used in the practice of the invention can be prepared in any suitable manner. Generally speaking, the methods ordinarily used in formulating bentonite containing drilling fluids can be used to prepare said slurries. It is usually preferred to first prepare a bentonite slurry and then incorporate the magnesium oxide therein; preferably with a minimum amount of mixing but which is at least sufficient to insure uniform dispersion of the magnesium oxide in the bentonite slurry.

When drilling with bentonite containing drilling fluids it is within the scope of the invention, but less preferred, to use a portion of said drilling fluid as a base starting material. In such instances it will usually be desirable to incorporate from 5 to 30 ppb additional bentonite in said portion of drilling fluid, and then add the magnesium oxide. This practice is less preferred because it is believed there would be less control of gelation time than with new slurries.

It is also within the scope of the invention, if desirable, to incorporate any of the conventional bridging materials such as sugar cane bagasse, cottonseed hulls, or other fibrous materials into the magnesium oxide-bentonite slurries used in the practice of the invention. The use of such bridging materials may be desirable if the voids or pores of the thief formation are relatively large or believed to be relatively large. Said bridging materials will usually be used in amounts of 5 to 30 pounds per barrel of slurry.

The magnesium oxide-bentonite slurries used in the practice of the invention can be introduced into the well and into the zone of lost circulation (thief formation) in any suitable manner. It is one of the advantages of the invention that said slurries, being readily pumpable fluids initially, can be conveniently introduced into the well and into the zone of lost circulation by pumping the slurry down the drill pipe and out through the bit into the well bore. Thus, equipment already available on the well can be employed.

The thief formation will usually be at or near the bottom of the well bore because when the porous formation is encountered it will immediately begin to take drilling fluid and the loss of drilling fluid will usually increase as the porous formation is penetrated. In such situations the slurry can be spotted at the locus of the thief formation by pumping a slug of the slurry down and out of the drill pipe. It may be, however, that the thief formation is at a point farther up in the well bore and such condition can result from failure of a previous seal in which case the drill pipe can be raised so that the slug of slurry can be deposited at the locus of the thief formation. Thus, in the practice of the invention the drill pipe can be left essentially on bottom or close thereto, or can be raised any convenient distance for depositing the slurry at the locus of the thief formation. Not having to remove the bit is a distinct advantage because to do so requires two trips on the drill pipe — one to remove the bit and another to reinstall the bit. This can be time consuming and relatively expensive, particularly on the deeper wells.

However, it is within the scope of the invention to remove the bit and introduce the slurry through the open ended drill pipe. This practice can be desirable when it is suspected, or known, that the thief zone is not at or near the bottom of the well bore. In such instances the open end of the drill pipe can be positioned at the locus of the thief zone and the slurry permitted to flow into the thief or loss zone by gravity, e.g., under the influence of the naturally attendant hydrostatic head. Or, if desired, the slurry can be squeezed by placing additional hydrostatic pressure on the slug of slurry. This can be done by pumping drilling fluid in on top of the slug of slurry while keeping the drilling fluid return valve closed. Any suitable squeeze pressure, e.g., in the order of up to about 500 psi can be used. Any other suitable squeeze technique can be employed.

In the practice of the invention the magnesium oxide-bentonite slurries used will set to a stiff condition after placement in the zone of lost circulation, i.e., the thief zone or thief formation into which the drilling fluid is flowing instead of returning up the annulus to the surface. In the laboratory the gels in said set stiff condition resemble stiff hard greases. They are nonpumpable when employing normal oil field equipment and the casing programs normally employed in casing wells. As the slurry is placed into the formation gelation occurs and the slurry thickens, attains said stiff condition, and forms a plug or barrier between the drilling fluid and the loss circulation zone. The pressure required to move said plug farther into the formation is greater than that required to circulate the drilling fluid, so normal circulation of the drilling fluid is restored.

Thus, as used herein and in the claims, unless otherwise specified, the term "set gel" refers to a stiff gel which is nonpumpable when employing normal oil-field equipment.

The following examples will serve to further illustrate the invention.

EXAMPLE I

Two series of test runs were carried out to determine the thickening time of various bentonite-magnesium oxide slurries. In Series A a fully prehydrated bentonite slurry containing 20 pounds of commercial grade Wyoming bentonite per barrel of slurry (ppb) was used. This Series A bentonite slurry was prepared in conventional manner using fresh water. In Series B two freshly prepared bentonite slurries containing (a) 20 ppb, and (b) 30 ppb, of said bentonite were used. Said Series B bentonite slurries were prepared in the same manner as the Series A slurry, but were aged only about two hours prior to use.

In both the Series A runs and the Series B runs magnesium oxide was added to samples of the bentonite slurries, in the amounts indicated in Table I below, while stirring with a Lightnin mixer for 2 minutes. In each instance the sample volume used was sufficient to permit running viscosity tests and consistency tests. Said viscosity tests were run on the well known Model 35 Fann viscometer. The consistency tests were run using a Howco cement consistometer. As here carried out, the slurry samples were stirred in a consistency cup consistometer atmospheric pressure while being heated in an oil bath. The slurry samples were heated from 80° to 120° F. and then maintained at 120° F. for the duration of the test. The rate of heating is not critical in this temperature range. Details of said Howco consistometer and its use can be found in API RP10B, 5th Edition, May 1956.

The results of said test runs are set forth in Table I below.

TABLE I

| VISCOSITY AND CONSISTENCY OF BENTONITE - MgO SLURRIES | | | | | |
|---|---|---|---|---|---|
| Time, min. | Apparent Viscosity* cp (at 171 sec$^{-1}$) | Slurry Consistency* Howco units | Time, min. | Apparent Viscosity cp (at 171 sec$^{-1}$) | Slurry Consistency Howco units |
| Series A - Using "prehydrated" bentonite slurry (fully yielded) | | | | | |
| 20 ppb bentonite, 1.0 ppb MgO | | | 20 ppb bentonite, 2.0 ppb MgO | | |
| 0 | 417 | 4 | 0 | — | 7 |
| 7 | 705 | 7 | 1 | 690 | 8 |
| 16 | 720 | 8 | 10 | 735 | 9 |
| 36 | 720 | 9 | | | |
| Let stand quiescent 15 minutes | | | Let stand quiescent 15 minutes | | |
| 51 | — | 10+ | 25 | — | 10+ |

TABLE I-continued

VISCOSITY AND CONSISTENCY OF BENTONITE - MgO SLURRIES

| Time, min. | Apparent Viscosity* cp (at 171 sec$^{-1}$) | Slurry Consistency* Howco units | Time, min. | Apparent Viscosity cp (at 171 sec$^{-1}$) | Slurry Consistency Howco units |
|---|---|---|---|---|---|
| \multicolumn{6}{c}{Series B - Using "freshly prepared" bentonite slurries} ||||||
| \multicolumn{3}{c}{20 ppb bentonite, 1.0 ppb MgO} | \multicolumn{3}{c}{20 ppb bentonite, 2.0 ppb MgO} ||||
| 0 | 69 | 0 | 0 | 96 | 0 |
| 8 | 300 | 1 | 8 | 450 | 3 |
| 24 | 540 | 2 | 20 | 630 | 4 |
| 45 | 570 | 2 | | | |
| | Let stand quiescent 72 minutes | | | Let stand quiescent 20 minutes | |
| 117 | — | 4 | 40 | | 7 |
| \multicolumn{3}{c}{30 ppb bentonite, 0.25 ppb MgO} | \multicolumn{3}{c}{30 ppb bentonite, 0.5 ppb MgO} ||||
| 0 | 105 | 0 | 0 | 120 | 1 |
| 14 | 195 | 1 | 6 | 225 | 2 |
| 26 | 525 | 2 | 12 | 840 | 6 |
| 38 | 980 | 4 | 23 | 900+ | 10 |
| \multicolumn{3}{c}{30 ppb bentonite, 0.75 ppb MgO} | \multicolumn{3}{c}{30 ppb bentonite, 1.0 ppb MgO} ||||
| 0 | 135 | 1 | 0 | 150 | 1 |
| 6 | 885 | 2 | 4 | 690 | 3 |
| 12 | 900+ | 7 | 6 | 900+ | 6 |
| 24 | — | 9 | 11 | — | 10 |

*Apparent Viscosity at 171 reciprocal seconds equals 3 × 100 rpm Fann reading. Slurry Consistency measured with HOWCO consistometer at 80 to 120° F temperature and atmospheric pressure. Units rounded off to whole numbers. Ten units is considered the maximum pumping consistency for cement. Ten units are equivalent to 100 U$_c$.

Referring to the above Table I, the data there set forth illustrate an important advantage of the invention. Said data illustrate the controlled gelation time of the MgO-bentonite systems used in the practice of the invention.

For example, referring to the last four systems, the data show that with increasing MgO concentration the gelation time decreases. This property of the MgO-bentonite systems makes it possible to tailor a system for particular well conditions, e.g., depth of the zone of lost circulation. Thus, for example, for the deeper zones of lost circulation one would use lower concentrations of MgO for a given bentonite concentration.

EXAMPLE II

Another series of test runs was carried out to compare the properties of bentonite gels prepared from prehydrated bentonite slurry and MgO, with gels prepared using gelling agents other than magnesium oxide. The bentonite slurry was used as prepared in conventional manner using a commercial grade of Wyoming bentonite and fresh water, and contained 30 pounds per barrel (ppb) of bentonite. The slurry was fully prehydrated prior to use. The gelling agents used in this series of runs were: magnesium oxide; Portland cement (API - Class H); sodium silicate; lime; sodium aluminate; sodium hydroxide; and sodium carbonate.

In this series of runs the samples to be tested were prepared in substantially the same manner as described above in Example I by adding the gelling agent, in the amounts shown in Table II below, to samples of said bentonite slurry. In general, in preparing said samples it was desired to: (1) use amounts of said gelling agents which were the same as one of the presently preferred systems of Table I above, e.g., 0.5 ppb of gelling agent in 30 ppb bentonite slurry; and (2) where possible, obtain a pH of at least 11.5 on the sample to be tested in accordance with the prior art teachings with respect to the gelling agents other than MgO. In each instance the sample volume was sufficient to permit the running of viscosity and consistency tests as in Example I and, in addition, gel stability tests. Said stability tests were carried out by placing portions of each test sample in sealed glass jars and aging the sample for 3 days at: (a) room temperature; and (b) 80° C. (oven). At the conclusion of said stability tests the apparent viscosities were redetermined as a measure of stability. The aged samples were then stirred until there was evidence (visual) of gel dispersion (breaking). If the sample did not disperse after 30 minutes stirring, it was considered stable, i.e., nondispersible.

The results of said tests are set forth in Table II below.

TABLE II

Comparison of MgO and Other Gelling Agents In 30 ppb Prehydrated Bentonite In Fresh Water

| Material | Conc ppb | pH initial | AV* | TT* min. | Aged 3 Days at Room Temp TTD* | Aged 3 Days at Room Temp AV* | Aged 3 Days at 80° C TTD* | Aged 3 Days at 80° C AV* |
|---|---|---|---|---|---|---|---|---|
| MgO | 0.25 | 9.6 | | NM* | 38+ | Did not disperse | NM | NM |
| MgO | 0.5 | 9.6 | | 50 | 23 | Did not disperse | | Did not disperse |
| Cement | 0.5 | 9.2 | | 175 | 10+ | <2 | 95 | <2 | 81 |
| Cement | 2.0 | 10.5 | | 300+ | NM | NM | NM | NM | NM |
| Na$_2$SiO$_3$ | 0.5 | 10.1 | | 40 | 10+ | <2 | 94 | <2 | 111 |
| Na$_2$SiO$_3$ | 2.5 | 11.7 | | 300+ | 0 | <2 | 109 | <2 | 129 |
| Lime | 0.5 | 8.8 | | 57− | 30+ | <2 | 122 | <2 | 122 |
| Lime | 5.0 | 11.5 | | 300+ | 0 | Did not disperse | | Did not disperse |
| NaAlO$_2$ | 0.5 | 11.8 | | 300+ | 0 | Did not disperse | | Did not disperse |
| NaOH | 0.5 | 12.0 | | 300+ | 0 | <2 | 180 | <2 | 125 |
| Na$_2$CO$_3$ | 0.5 | 9.9 | | 150 | 120+ | <2 | 174 | <2 | 144 |
| Na$_2$CO$_3$ | 7.5 | 10.9 | | 300+ | NM | Did not disperse | <2 | 75 |

TABLE II-continued

Comparison of MgO and Other Gelling Agents
In 30 ppb Prehydrated Bentonite In Fresh Water

| Material Conc | pH | AV* | TT* | Aged 3 Days at Room Temp | | Aged 3 Days at 80° C | |
|---|---|---|---|---|---|---|---|
| ppb | initial | | min. | TTD* | AV* | TTD* | AV* |
| Base Mud | — | 7.7 | 105 | NM | NM | NM | NM |

*AV = Apparent Viscosity measured at 511 sec$^{-1}$ on Model 35 Fann Viscometer.
TT = Time in minutes to reach 100 U$_c$ with atmospheric pressure consistometer.
TTD = Time in minutes to disperse while being stirred on a Multimixer. If the sample stirred 30 minutes without dispersing it was considered non-dispersible.
NM = Not measured.

Referring to the above Table II, magnesium oxide when used in a preferred amount in accordance with the present invention, e.g., 0.5 ppb, will give a pH of only about 9.6 in 30 ppb bentonite slurry. This is an advantage. High pH values cause many shale formations to slough. If the zone of lost circulation is in shale, or if a shale formation can be exposed to the lost circulation fluid, there is considerable potential danger in using the high pH systems of the prior art.

Still another advantage of the MgO-bentonite systems of the invention, as shown by the data in Table II, is that they are irreversible, i.e., the gels were stable and did not disperse (break) when aged 3 days at room temperature or when aged three days at 80° C., even when stirred for 30 minutes at the conclusion of the aging tests. This is considered to be a very desirable property because it indicates the gel will remain firm and be difficult to displace after being placed in the lost circulation zone and allowed to set. It has been further observed that the developed or gelled MgO-bentonite systems behave or have properties much like a stiff grease, after the consistometer tests, in that they were not dispersed by water. This property is highly desirable where a slurry is placed in a loss zone containing moving water.

Still another important property and advantage of the MgO-bentonite systems of the invention is that discussed above in connection with the data set forth in Table I, e.g., the gelation time can be controlled to permit pumping the slurry into the zone of lost circulation before gelation occurs to the extent of forming a set, firm, nonpumpable gel.

The cement-bentonite system containing 0.5 ppb cement in 30 ppb bentonite slurry has a pH of only 9.2. However, the TT time indicates this system would have a pumping time of only about 10 minutes plus. Furthermore, this system dispersed in less than two minutes stirring time after the aging tests. The cement-bentonite system containing 2.0 ppb cement in the 30 ppb bentonite has a high initial viscosity. From these data it was concluded the cement-bentonite systems are markedly inferior to the MgO-bentonite systems of the invention.

The sodium silicate-bentonite system containing 0.5 ppb of the sodium silicate in 30 ppb bentonite slurry had a pH of 10.1 and a low initial apparent viscosity. However, said systems has a low TT time of only 10 minutes plus. Furthermore, the gel formed was reversible, i.e., it dispersed or broke in less than two minutes stirring time after the aging tests. The sodium silicate-bentonite system containing 2.5 ppb sodium silicate in the 30 ppb bentonite slurry sets too rapidly to permit pumping into place and was reversible. On the basis of these data it was concluded the sodium silicate-bentonite systems are markedly inferior to the MgO-bentonite systems of the invention.

The lime-bentonite system containing 0.5 ppb lime in the 30 ppb bentonite slurry had a desirably low pH of 8.8 and a 30+ minute TT time. However, the gel formed was reversible and unstable because it dispersed in less than two minutes stirring time after the aging tests. The lime-bentonite system containing 5.0 ppb lime in the 30 ppb bentonite slurry formed a stable gel which did not disperse during or after the aging tests. It was necessary to add a small amount of NaOH to increase the pH to 11.5. However, the zero TT time shows that the gel sets to rapidly to permit pumping into place. Based on these data it was concluded the lime-bentonite systems are markedly inferior to the MgO-bentonite systems of the invention.

The sodium aluminate-bentonite system containing 0.5 ppb of sodium aluminate in the 30 ppb bentonite slurry formed a stable irreversible gel. However, the zero TT time shows that the gel sets too rapidly to permit pumping into place. On this basis it was concluded the sodium aluminate-bentonite system is markedly inferior to the MgO-bentonite systems of the invention.

The sodium hydroxide-bentonite system containing 0.5 ppb sodium hydroxide in the 30 ppb bentonite slurry sets too rapidly to permit pumping into place. This is shown by the zero TT time. Furthermore, the gel formed was reversible, i.e., unstable as shown by the fact that it dispersed in less than two minutes stirring time after the aging tests. Based on these data it was concluded that the sodium hydroxide-bentonite systems are inferior to the MgO-bentonite systems of the invention.

The sodium carbonate-bentonite system containing 0.5 ppb of sodium carbonate in the 30 ppb bentonite slurry has too long a thickening time (TT time) for most applications. Furthermore, the gel formed was unstable. The 7.5 ppb sodium carbonate system was stable at room temperature but was unstable at 80° C. Based on these data it was concluded that the sodium carbonate-bentonite systems are inferior to the MgO-bentonite systems of the invention.

EXAMPLE III

A field test was carried out to confirm the efficiency of the MgO-bentonite systems in overcoming lost circulation, e.g., restoring circulation in an actual drilling well. This test was carried out on a well being drilled in Midland County, Texas.

While drilling at a depth of 5,800 feet circulation decreased to only 80 percent. A pit of 150 barrels MgO-bentonite slurry was prepared by adding 1.06 pounds of MgO per barrel of slurry to a prehydrated bentonite slurry containing 20 pounds of bentonite per barrel of slurry. The 150 barrels of MgO-bentonite slurry was then displaced down the drill pipe and out through the bit at a rate of 6 barrels per minute. Drilling was resumed. In the estimated one hour and 20 minutes required to circulate bottoms up, full circulation was restored. None of the MgO-bentoite slurry was observed coming back.

After making a trip to change the bit at 6,860 feet there were no returns on going back to bottom. The drill pipe was pulled up about 30 to 60 feet off bottom. Using the same procedure as before, 150 barrels of MgO-bentonite slurry containing 1.06 ppb of MgO and 34 ppb of bentonite was pumped down the drill pipe at a rate of 6 barrels per minute. Upon resuming drilling full circulation was restored in about 45 minutes.

A complete loss of circulation occured at 7,603 feet after making a connection. Essentially the same procedure as in the preceding paragraph was followed in the preparation and placement of the MgO-bentonite slurry. After about 50 minutes, drill pipe drag increased and a few hours later the drill pipe was stuck. It was believed by those present that the high viscosity MgO-bentonite slurry had moved up the hole heavily laden with cuttings, bridged off the annulus, and stuck the pipe. After the drill stem was freed and the rig resumed drilling, the well was drilled to 7,650 feet with no further loss of circulation. This indicates that a portion of the MgO-bentonite slurry had entered the loss zone in the formation and plugged same.

The above-described three incidents of lost circulation demonstrate that the MgO-bentonite slurries used in the practice of the invention are effective in restoring circulation. The last incident suggests that less slurry should be used when the drill pipe is kept close to bottom, or the drill pipe raised 300–500 feet off bottom and the slurry allowed to flow by gravity into the loss zone.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for decreasing the permeability of a zone of lost circulation located in a formation penetrated by a well bore, which method comprises introducing into said well and into said zone an aqueous slurry having a pH no greater than about 9.6 and comprising bentonite suspended in sufficient water to render said slurry initially pumpable and a small amount of magnesium oxide, within the range of from 0.37 to 10 weight percent based on the weight of said bentonite, which is sufficient to cause controlled gelation of said slurry to a set gel after placement thereof in said zone.

2. A method for decreasing the permeability of a zone of lost circulation located in a formation penetrated by a well bore, which method comprises introducing into said well and into said zone an initially pumpable aqueous slurry having a pH no greater than about 9.6 and comprising from 15 to 40 pounds of bentonite per barrel of said slurry and a small but effective amount of magnesium oxide, within the range of from 0.15 to 1.5 pounds per barrel of said slurry, which is sufficient to cause controlled gelation of said slurry to a set gel after placement thereof in said zone.

3. A method according to claim 2 wherein a fibrous bridging material is also incorporated into said aqueous slurry in an amount within the range of from 5 to 30 pounds per barrel of said slurry.

4. A method according to claim 2 wherein:
the concentration of bentonite in said aqueous slurry is within the range of from 20 to 35 pounds per barrel of slurry; and
the concentration of magnesium oxide in said aqueous slurry is within the range of from 0.2 to 1.2 pounds per barrel of said slurry.

5. A method for decreasing the permeability of a zone of lost circulation located in a formation penetrated during the drilling of a well, which method comprises, in combination, the steps of:
preparing an aqueous slurry having a pH no greater than about 9.6 and comprising bentonite suspended in sufficient water to render said slurry initially pumpable, and magnesium oxide present in an amount sufficient to cause controlled gelation of said slurry to a set gel after placement of said slurry in said zone as described hereinafter, the amount of said bentonite being within the range of from 15 to 40 pounds per barrel of said slurry and the amount of said magnesium oxide being within the range of from 0.15 to 1.5 pounds per barrel of said slurry;
introducing said slurry into said well at a position adjacent said zone of lost circulation; and
introducing said slurry into said zone of lost circulation by the action of hydrostatic pressure on said slurry.

6. A method according to claim 5 wherein said hydrostatic pressure is that supplied by the hydrostatic head of said slurry.

7. A method according to claim 5 wherein said hydrostatic pressure is greater than the hydrostatic head of said slurry and is supplied by pumping drilling fluid into said well following said slurry.

8. A method according to claim 5 wherein:
said slurry is introduced into said well at a position adjacent and above said zone of lost circulation; and
said slurry is squeezed into said zone of lost circulation by pumping drilling fluid in on top of said slurry.

9. A method for decreasing the permeability of a zone of lost circulation located in a formation penetrated during the drilling of a well, which method comprises, in combination, the steps of:
interrupting said drilling;
introducing into said well and into said zone an initially pumpable aqueous slurry having a pH no greater than about 9.6 and comprising bentonite suspended in water in an amount within the range of from 15 to 40 pounds per barrel of said slurry and a small amount of magnesium oxide within the range of from 0.15 to 1.5 per barrel of said slurry, said amount of magnesium oxide being sufficient to cause a controlled gelation of said slurry with a controlled gelation time which is sufficient to permit placing said slurry in said zone before it gels to a set gel, and with said gel having sufficient gel stability to remain in place upon resumption of said drilling; and
resuming said drilling.

* * * * *

UNITED STATES PATENT OFFICE
CERTIFICATE OF CORRECTION

PATENT NO. : 4,014,394

DATED : March 29, 1977

INVENTOR(S) : Daniel F. Bailey

It is certified that error appears in the above—identified patent and that said Letters Patent are hereby corrected as shown below:

Column 10, line 59, after "1.5" insert --- pounds ---.

Column 10, line 64, after "said" insert --- set ---.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks